(12) United States Patent
Whitaker

(10) Patent No.: US 12,504,111 B2
(45) Date of Patent: Dec. 23, 2025

(54) I-BEAM SUPPORT SYSTEM AND METHOD OF USE

(71) Applicant: Dustin Whitaker, Childress, TX (US)

(72) Inventor: Dustin Whitaker, Childress, TX (US)

( * ) Notice: Subject to any disclaimer, the term of this patent is extended or adjusted under 35 U.S.C. 154(b) by 372 days.

(21) Appl. No.: 18/056,859

(22) Filed: Nov. 18, 2022

(65) Prior Publication Data

US 2024/0167614 A1 May 23, 2024

(51) Int. Cl.
*E04B 1/24* (2006.01)
*F16M 11/10* (2006.01)
*F16M 11/20* (2006.01)
*F16M 11/42* (2006.01)

(52) U.S. Cl.
CPC ......... *F16M 11/10* (2013.01); *F16M 11/2021* (2013.01); *F16M 11/42* (2013.01); *E04B 1/2403* (2013.01); *E04B 2001/2415* (2013.01); *E04B 2001/2427* (2013.01); *E04B 2001/2463* (2013.01)

(58) Field of Classification Search
CPC ......... B25B 11/00; B25B 11/02; B23K 37/04; B23K 37/0408; B23K 37/0426; B23K 37/0435; B23K 37/0443; E04B 2001/2424; E04B 2001/2457; B23Q 3/18; B23Q 3/186

USPC .................................. 52/127.1, 127.2, 749.1
See application file for complete search history.

(56) References Cited

U.S. PATENT DOCUMENTS 6,782,668 B2 * 8/2004 Bruce ..................... G09F 19/22
52/127.2
11,898,318 B1 * 2/2024 MacKarvich ........... E02D 27/02

* cited by examiner

*Primary Examiner* — Christopher J. Besler
(74) *Attorney, Agent, or Firm* — Shannon Warren

(57) ABSTRACT

An I-beam support system for aligning and leveling an I-beam during installation on a ground surface, wherein the I-beam support system comprises two sides, a hinge assembly and a fastener assembly. The two sides comprise a first side and a second side, each among the two sides comprises a beam clamp arm, a clamp arm hinge, a vertical support assembly, and a lower support assembly. The lower support assembly is configured to support the vertical support assembly on the ground surface. The I-beam support system is configured to selectively transition between a closed configuration and an open configuration. The closed configuration comprises the fastener assembly holding the two sides around a portion of the I-beam. The open configuration comprises the two sides unconnected at a distal end of the beam clamp arm, each among the vertical support assembly comprise an upper end adjusting support.

10 Claims, 10 Drawing Sheets

I-BEAM SUPPORT SYSTEM AND METHOD OF USE

CROSS-REFERENCE TO RELATED APPLICATIONS

Not applicable.

STATEMENT REGARDING FEDERALLY SPONSORED RESEARCH OR DEVELOPMENT (IF APPLICABLE)

Not applicable.

REFERENCE TO SEQUENCE LISTING, A TABLE, OR A COMPUTER PROGRAM LISTING COMPACT DISC APPENDIX (IF APPLICABLE)

Not applicable.

BACKGROUND OF THE INVENTION

No prior art is known to the Applicant.

BRIEF SUMMARY OF THE INVENTION

An I-beam support system for aligning and leveling an I-beam during installation on a ground surface, wherein said I-beam support system comprises two sides, a hinge assembly and a fastener assembly. Said two sides comprise a first side and a second side, each among said two sides comprises a beam clamp arm, a clamp arm hinge, a vertical support assembly, and a lower support assembly. Said lower support assembly is configured to support said vertical support assembly on said ground surface. Said I-beam support system is configured to selectively transition between a closed configuration and an open configuration. Said closed configuration comprises said fastener assembly holding said two sides around a portion of said I-beam. Said open configuration comprises said two sides unconnected at a distal end of said beam clamp arm, each among said vertical support assembly comprise an upper end adjusting support. Said I-beam support system is configured to selectively press on an upper portion of a web portion of said I-beam with said upper end adjusting support of said vertical support assembly. Said beam clamp arm of said two sides are configured for holding a lower portion of said web portion to align said I-beam, by selectively adjusting an angle between said upper portion and said lower portion, said I-beam support system is configured to adjust a perpendicular angle of said I-beam. Said vertical support assembly can attach to a central portion of said beam clamp arm using a vertical extension plate and a vertical support hinge, for each among said two sides, said vertical support assembly can rotate about a first axis aligned with said vertical support hinge. Said vertical support assembly comprises a support arm having an upper end and a lower end. Said vertical support hinge can rotatably attach a central portion of said support arm with a portion of said vertical extension plate. Said vertical support assembly can further comprise said upper end adjusting support attached to said upper end. Said upper end adjusting support comprises an assembly of a nut and a bolt with said nut attached to a portion of said upper end and said bolt selectively screwed into said nut.

Said I-beam support system for aligning and leveling said I-beam during installation on said ground surface, wherein said I-beam support system comprises said two sides, said hinge assembly and said fastener assembly. Said two sides comprise said first side and said second side, each among said two sides comprises said beam clamp arm, said clamp arm hinge, said vertical support assembly, and said lower support assembly. Said lower support assembly is configured to support said vertical support assembly on said ground surface. Said I-beam support system is configured to selectively transition between said closed configuration and said open configuration. Said closed configuration comprises said fastener assembly holding said two sides around a portion of said I-beam. Said open configuration comprises said two sides unconnected at said distal end of said beam clamp arm, each among said vertical support assembly comprise said upper end adjusting support. Said I-beam support system is configured to selectively press on said upper portion of said web portion of said I-beam with said upper end adjusting support of said vertical support assembly. Said beam clamp arm of said two sides are configured for holding said lower portion of said web portion to align said I-beam, by selectively adjusting an angle between said upper portion and said lower portion, said I-beam support system is configured to adjust said perpendicular angle of said I-beam.

Said I-beam support system for aligning and leveling said I-beam during installation on said ground surface, wherein said I-beam support system comprises said two sides, said hinge assembly and said fastener assembly. Said two sides comprise said first side and said second side, each among said two sides comprises said beam clamp arm, said clamp arm hinge, said vertical support assembly, and said lower support assembly. Said lower support assembly is configured to support said vertical support assembly on said ground surface. Said I-beam support system is configured to selectively transition between said closed configuration and said open configuration. Said closed configuration comprises said fastener assembly holding said two sides around a portion of said I-beam. Said open configuration comprises said two sides unconnected at said distal end of said beam clamp arm, each among said vertical support assembly comprise said upper end adjusting support. Said I-beam support system is configured to selectively press on said upper portion of said web portion of said I-beam with said upper end adjusting support of said vertical support assembly. Said beam clamp arm of said two sides are configured for holding said lower portion of said web portion to align said I-beam, by selectively adjusting an angle between said upper portion and said lower portion, said I-beam support system is configured to adjust said perpendicular angle of said I-beam, each among said beam clamp arm comprise a hinge end, said distal end, an interior edge, an exterior edge, a top surface and a bottom surface. Said interior edge of said beam clamp arm comprises two flange indentions comprising a first flange indention and a second flange indention.

BRIEF DESCRIPTION OF THE SEVERAL VIEWS OF THE DRAWING

FIG. 5 illustrates a perspective overview of a first side 402a.

DETAILED DESCRIPTION OF THE INVENTION

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
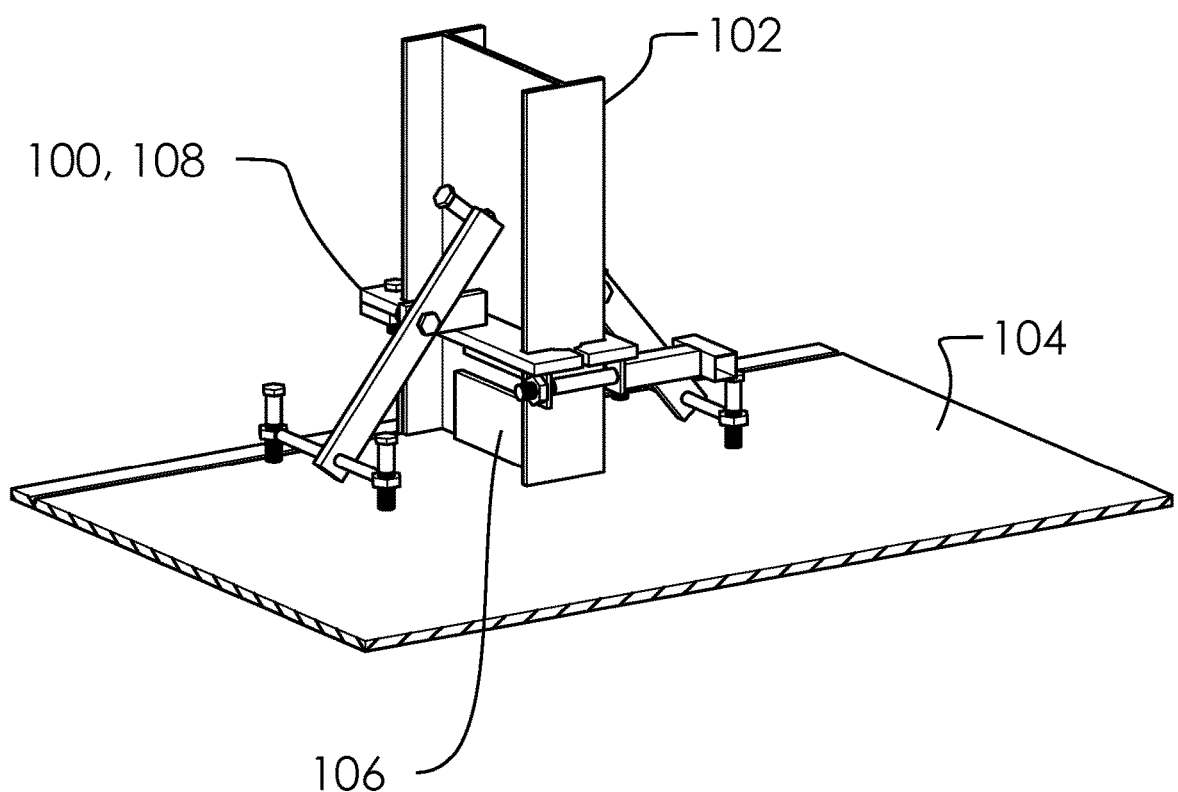
FIG. 1 illustrates a perspective overview of an I-beam support system 100 in a closed configuration 108 and attached to a lower portion of an I-beam 102.

FIG. 1 illustrates a perspective overview of an I-beam support system 100 in a closed configuration 108 and attached to a lower portion of an I-beam 102.

Said I-beam support system 100 can be used in construction for the task of aligning and leveling said I-beam 102. It is known in construction that the task of standing said I-beam 102 along the perimeter of a ground surface 104, such as a concrete slab, can be difficult.

Figure 2:
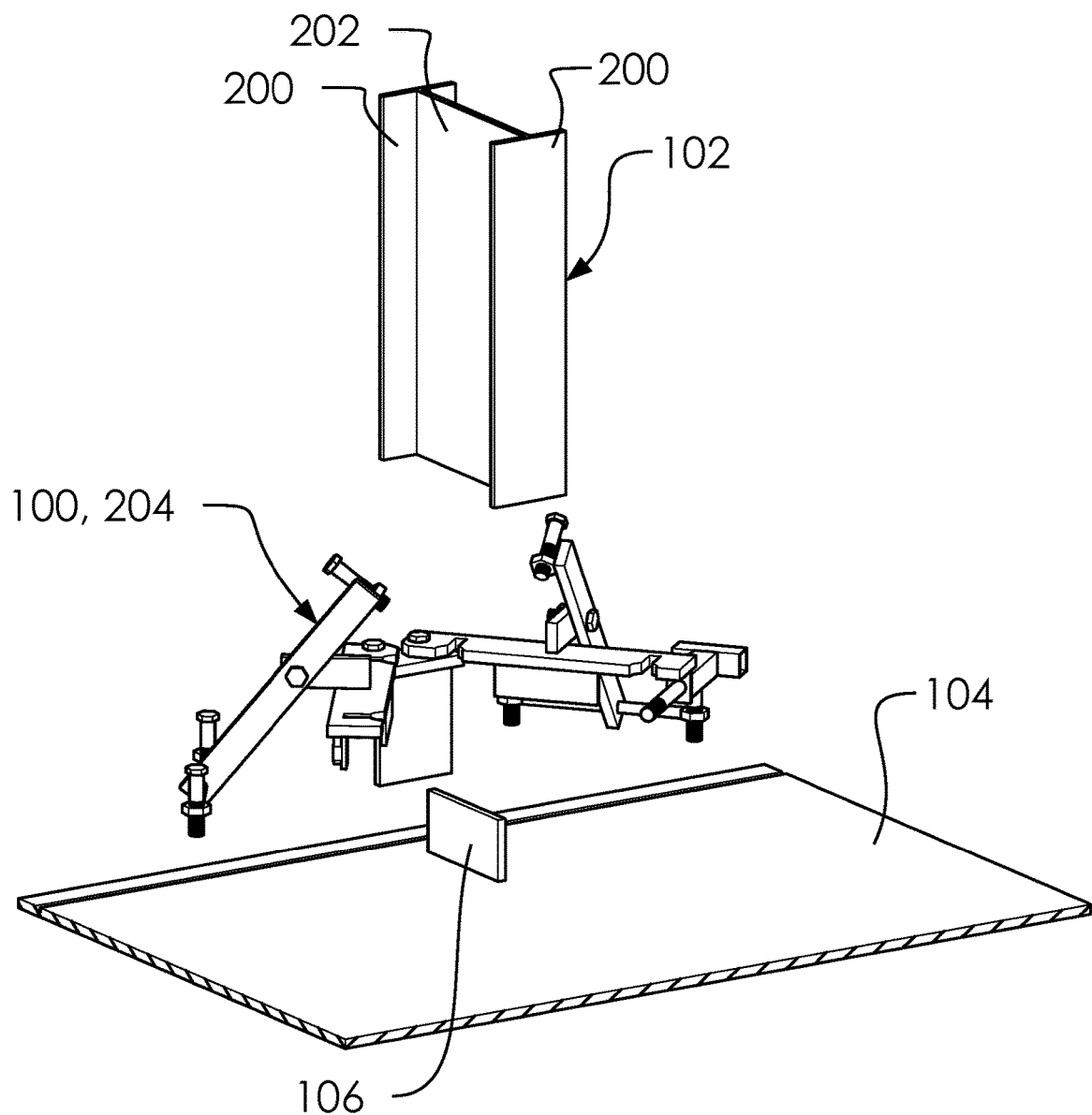
FIG. 2 illustrates a perspective overview of said I-beam support system 100 in an open configuration 204 with said I-beam 102, a ground surface 104 and said I-beam support system 100 being exploded relative to one another.

FIG. 2 illustrates a perspective overview of said I-beam support system 100 in an open configuration 204 with said I-beam 102, said ground surface 104 and said I-beam support system 100 being exploded relative to one another.

One difficulty is maintaining a perpendicular angle to the ground while welding said I-beam 102 to a weld plate 106. Many times, said weld plate 106 will be integrated into the floor such as concrete or other hardened surface. A welder will later come and attach said I-beam 102 to said weld plate 106. Due to the heat output of a welding system, said I-beam 102 will frequently move around expand shrink and lose its original orientation.

Workman have come up with many alternative ways to hold up the I-beam, but none account for its movement during attachment. Placing large objects, what wedging tools between the tab and I-beam, or calling upon coworkers to hold said I-beam 102 are examples of means for holding said I-beam 102 upright.

Said I-beam 102 can comprise a well-known construction part. It can also be known as an h-beam in some circumstances. Said I-beam 102 can comprise two flanges 200 and a web portion 202, as is known in the art. With dimensional changes to its parts, said I-beam support system 100 can be helpful on all known variations of said I-beam 102, such as W-section and S-section designs.

Figure 3A:
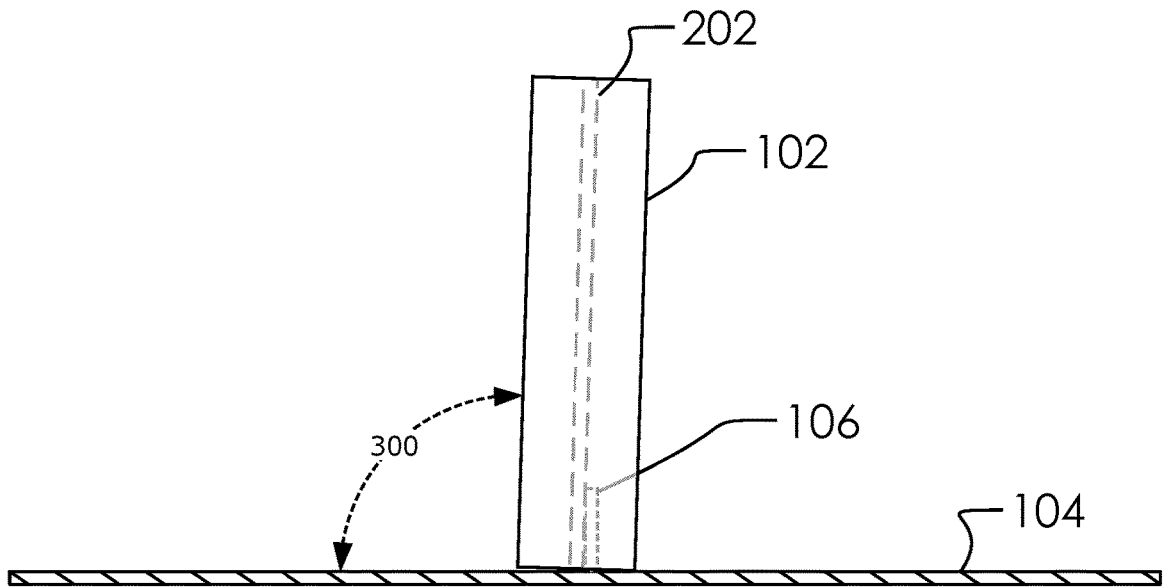
FIGS. 3A and 3B illustrate an elevated side view of said I-beam 102 at a non-perpendicular angle 300 and at a perpendicular angle 302.
Figure 3B:
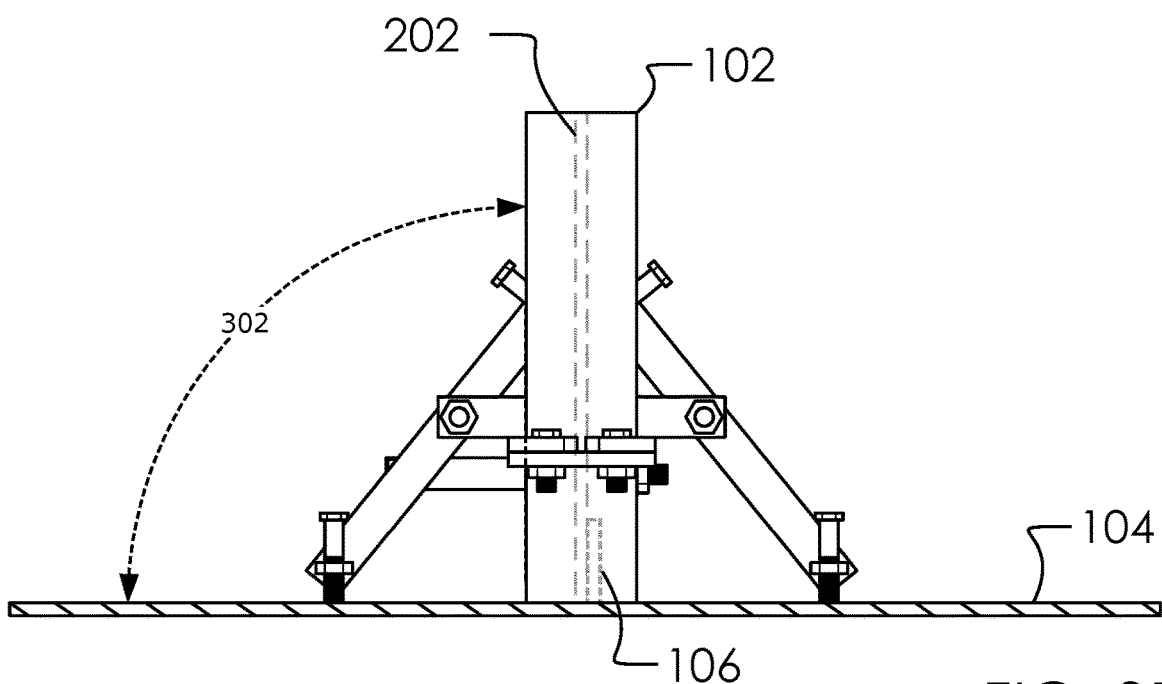

FIGS. 3A and 3B illustrate an elevated side view of said I-beam 102 at a non-perpendicular angle 300 and at a perpendicular angle 302.

In construction one goal is to ensure that said I-beam 102 is at said perpendicular angle 302 with respect to gravity. In many cases this will be perpendicular to said ground surface 104. However, where said ground surface 104 is uneven or on a hill for rough, it is advantageous to calculate said perpendicular angle 302 and the line said I-beam 102 with gravitational force, being straight down. Having said I-beam support system 100 available to hold said I-beam 102 upright will be very advantageous in such circumstances.

Said I-beam support system 100 can comprise a tool for holding a portion of said I-beam 102 at a fixed angle relative to said ground surface 104 and said weld plate 106.

It is common in and around the community of the applicant to attach said web portion 202 to said weld plate 106, as discussed above. However, it would be expected to one in the art that said I-beam support system 100 could hold said I-beam 102 for other construction settings. Accordingly, this disclosure encompasses those uses of said I-beam support system 100 with 102/or other construction elements.

Figure 4:
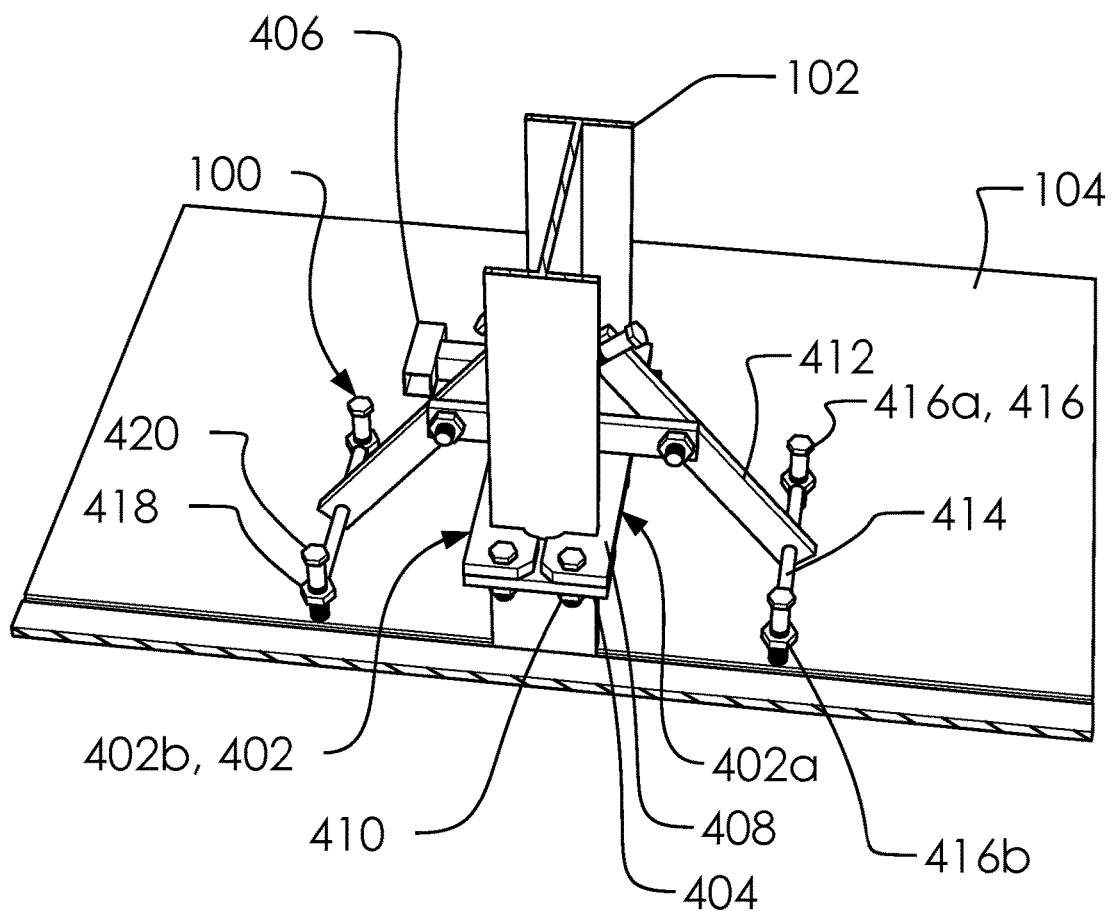
FIG. 4 illustrates a perspective overview of said I-beam support system 100 around said I-beam 102.

FIG. 4 illustrates a perspective overview of said I-beam support system 100 around said I-beam 102.

In one embodiment, said I-beam support system 100 can comprise two sides 402 comprising a first side 402a and a second side 402b, a hinge assembly 404 and a fastener assembly 406.

Each among said two sides 402 can comprise a beam clamp arm 408, a clamp arm hinge 410, a vertical support assembly 412, and a lower support assembly 414.

In one embodiment, said lower support assembly 414 can comprise two adjustable foot assemblies 416 comprising a first foot assembly 416a and a second foot assembly 416b. In one embodiment, said two adjustable foot assemblies 416 can each comprise a nut 418 being affixed to a portion of said lower support assembly 414 and a bolt 420 configured to screw up and down through said nut 418. Wherein, said two adjustable foot assemblies 416 can be adjusted relative to said lower support assembly 414 by turning said bolt 420.

Figure 5:
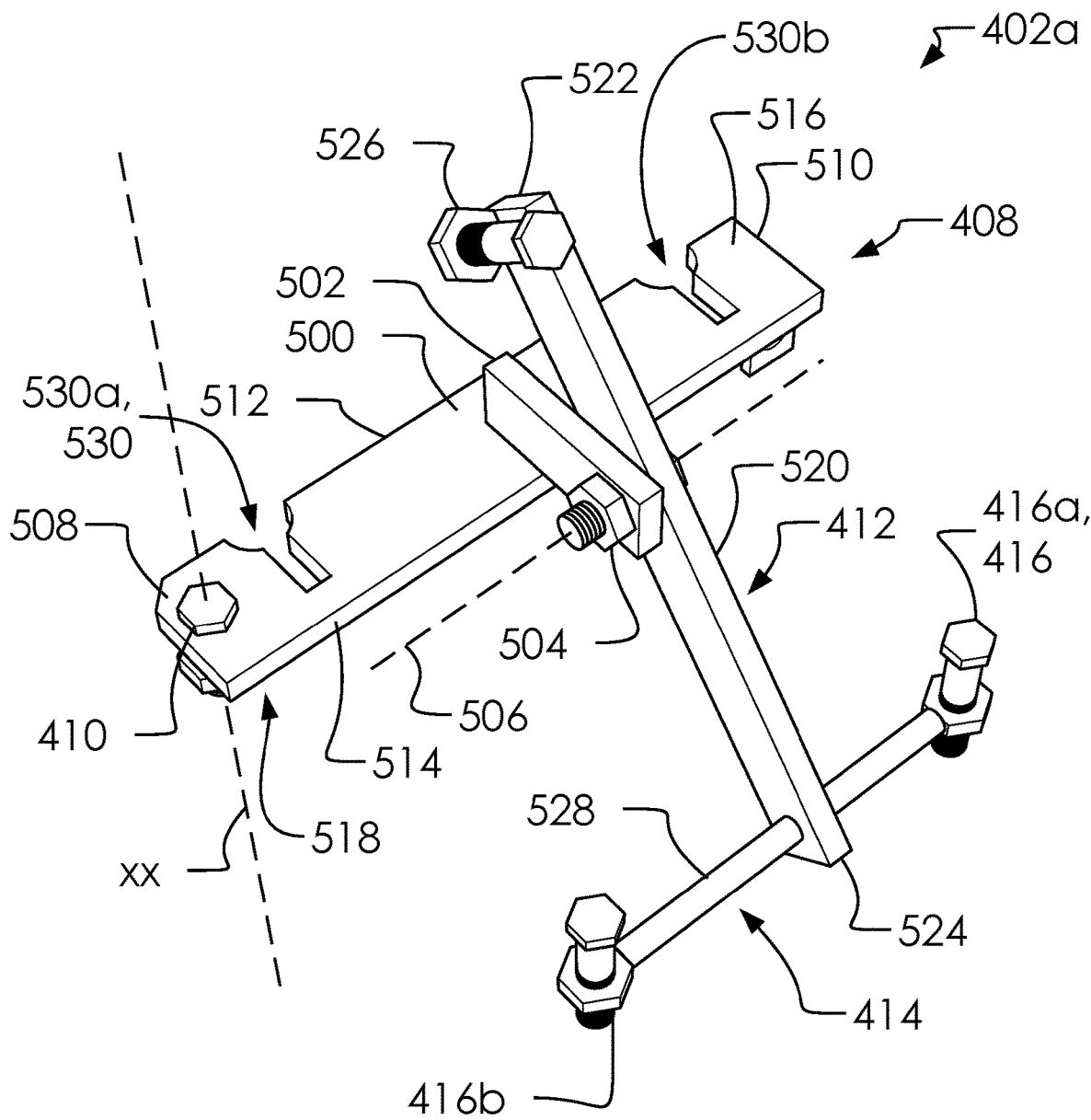

FIG. 5 illustrates a perspective overview of said first side 402a.

In one embodiment, said vertical support assembly 412 can attach to a central portion 500 of said beam clamp arm 408 using a vertical extension plate 502 and a vertical support hinge 504. Said vertical support hinge 504 can comprise a bolt and nut through a portion of said vertical extension plate 502 and said vertical support assembly 412. In one embodiment, said first side 402a can rotate about a first axis 506 aligned with said vertical support hinge 504.

Said beam clamp arm 408 can comprise a hinge end 508, a distal end 510, an interior edge 512, an exterior edge 514, a top surface 516 and a bottom surface 518.

Said vertical support assembly 412 can comprise a support arm 520 having an upper end 522 and a lower end 524. In one embodiment, said vertical support hinge 504 can rotateably attach a central portion of said support arm 520 with a portion of said vertical extension plate 502.

Said vertical support assembly 412 can further comprise an upper end adjusting support 526 attached to said upper end 522. In one embodiment, said upper end adjusting support 526 can comprise an assembly of said nut 418 and said bolt 420 with said nut 418 attached to a portion of said upper end 522 and said bolt 420 selectively screwed into said nut 418.

In one embodiment, said lower support assembly 414 can connect to a portion of said lower end 524 of said support arm 520. Said lower support assembly 414 can comprise a crossbar 528 extending in a substantially perpendicular and horizontal direction relative to said support arm 520. In one embodiment, said two adjustable foot assemblies 416 can be attached at each end of said crossbar 528, as illustrated.

In one embodiment, said interior edge 512 of said beam clamp arm 408 can comprise two flange indentions 530 comprising a first flange indention 530a and a second flange indention 530b.

In one embodiment, each among said two sides 402 can comprise a second axis 532 aligned with said clamp arm hinge 410. Said second axis 532 can comprise a substantially vertical axis configured to allow each among said two sides 402 to open and close relative to one another to selectively enclose a portion of said I-beam 102.

Figure 6A:
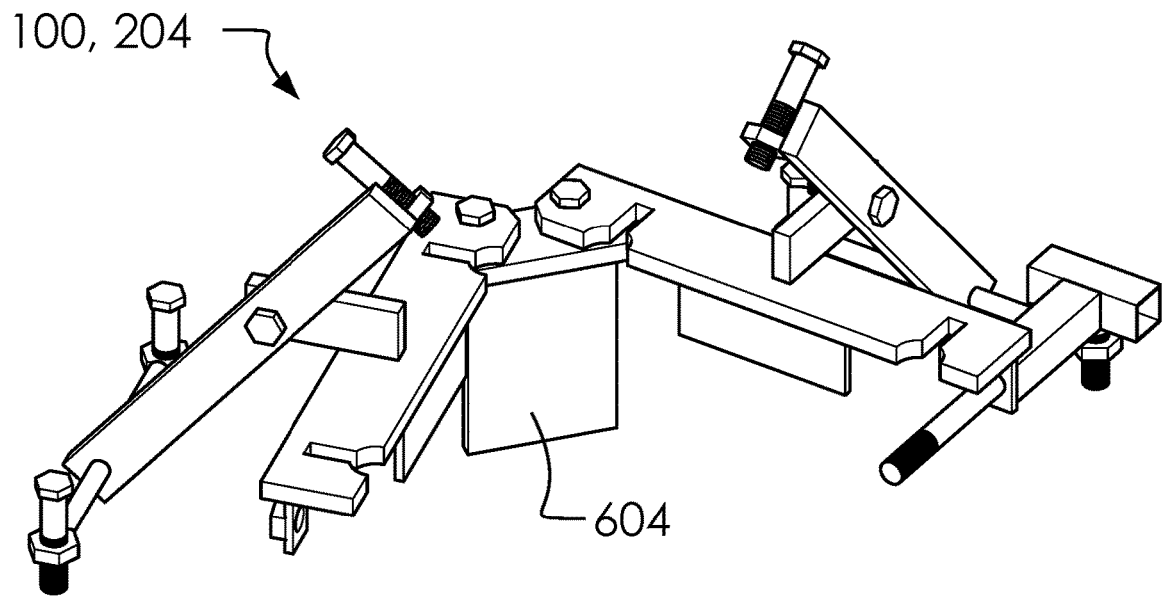
FIGS. 6A and 6B illustrate a perspective overview of said I-beam support system 100 in said open configuration 204 and said closed configuration 108, respectively.
Figure 6B:
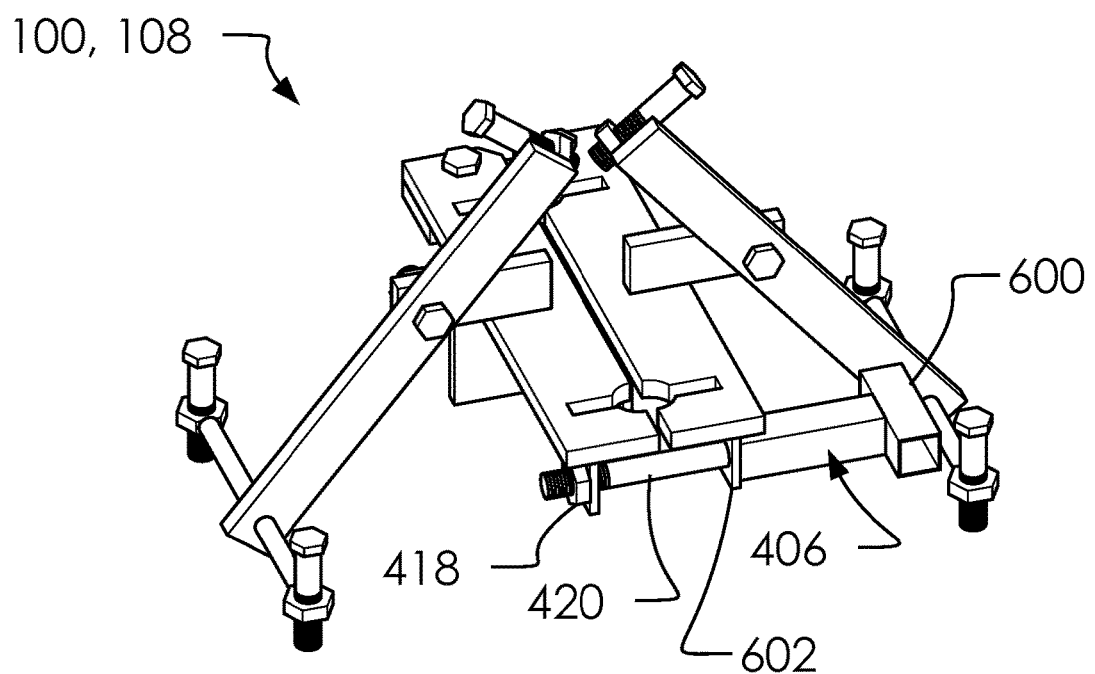

FIGS. 6A and 6B illustrate a perspective overview of said I-beam support system 100 in said open configuration 204 and said closed configuration 108, respectively.

With said I-beam support system 100 in said closed configuration 108, said fastener assembly 406 is configured to hold said two sides 402 in said closed configuration 108. In one embodiment, said fastener assembly 406 can comprise said nut 418 on one side of said two sides 402 and said bolt 420 on the other. In one embodiment, said fastener assembly 406 can further comprise a handle 600 for twisting said bolt 420 to tighten and loosen said two sides 402. Further wherein, each among said two sides 402 can comprise a lower receiving aperture plate 602 for aligning and receiving said fastener assembly 406, as illustrated.

In one embodiment, said hinge assembly 404 can further comprise a groove tab 604 being substantially vertical and below said clamp arm hinge 410 of said two sides 402.

Figure 7A:
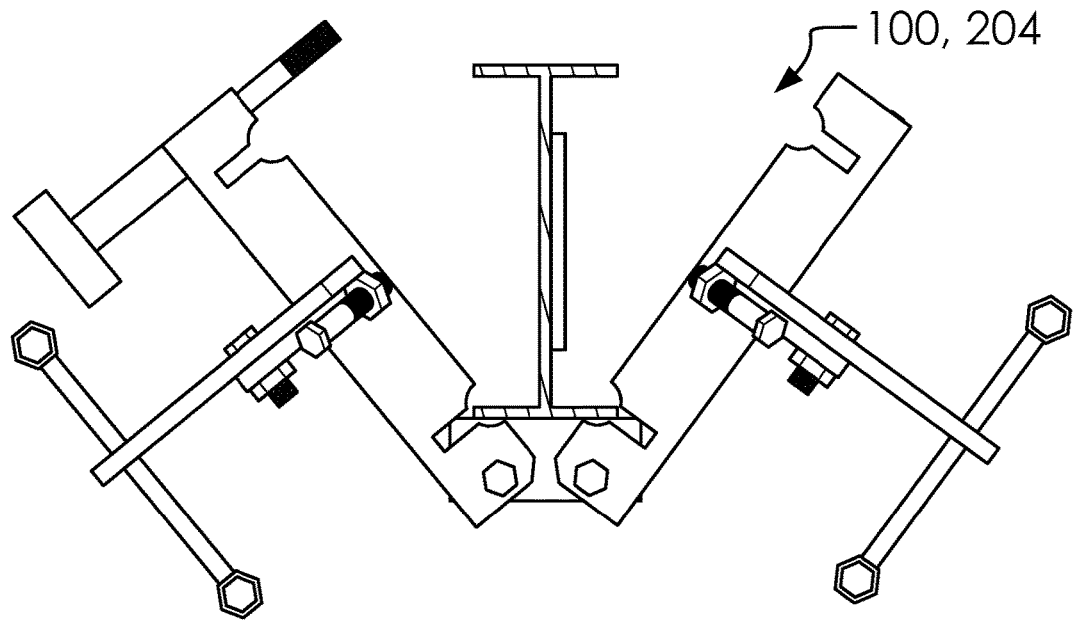
FIGS. 7A and 7B illustrate an elevated top view of said I-beam support system 100 with said I-beam 102 in said open configuration 204 and said closed configuration 108, respectively.
Figure 7B:
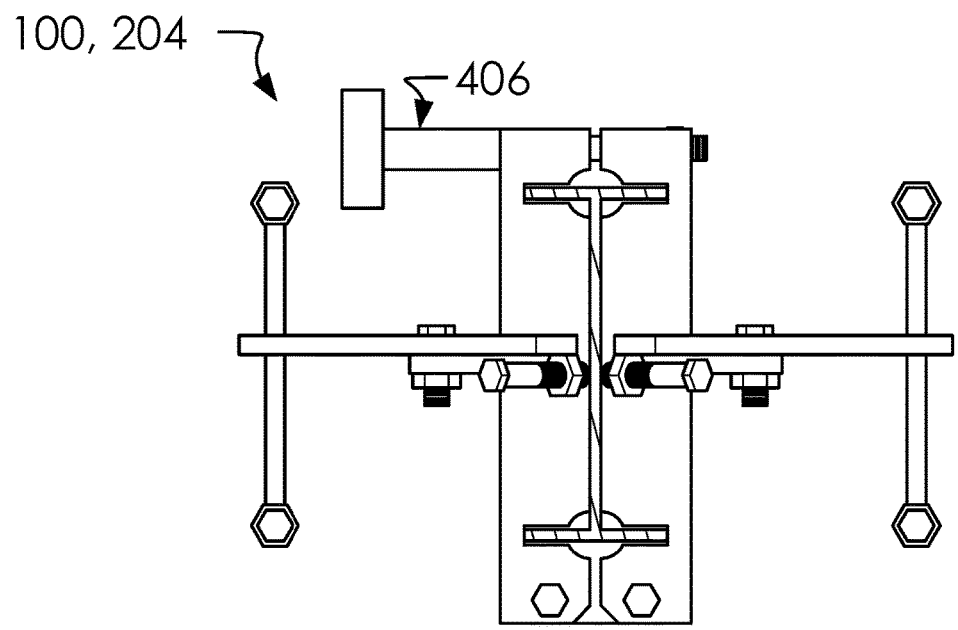

FIGS. 7A and 7B illustrate an elevated top view of said I-beam support system 100 with said I-beam 102 in said open configuration 204 and said closed configuration 108, respectively.

As illustrated, said two flange indentions 530 of said beam clamp arm 408 are configured to enclose a portion of said two flanges 200. Further, said two flange indentions 530 comprise sufficient space to allow said beam clamp arm 408 of each of said two sides 402 to slide past said two flange indentions 530 when transitioning between said closed configuration 108 and said open configuration 204.

Figure 8:
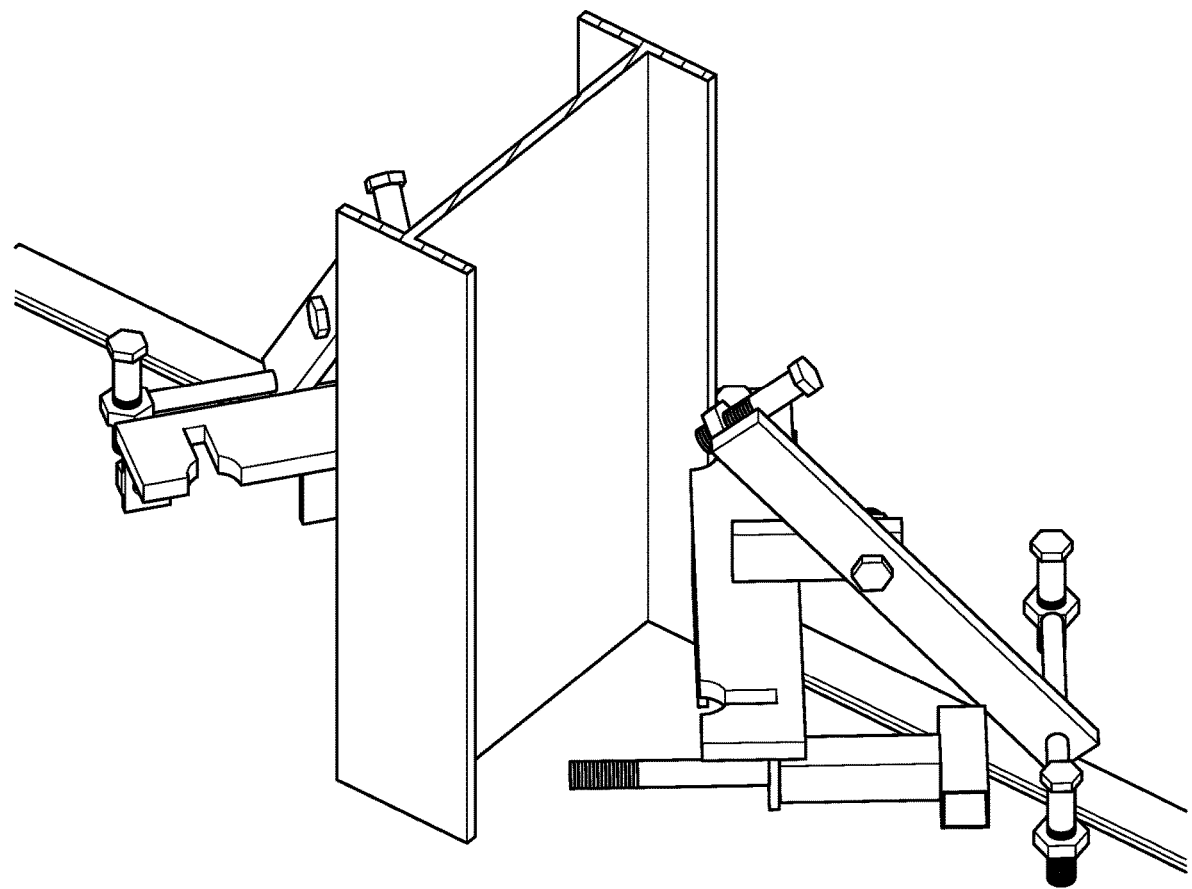
FIGS. 8 and 9 illustrate a perspective overview of said I-beam support system 100 in said closed configuration 108 from a front side and a rear side, respectively.
Figure 8:
Figure 9:
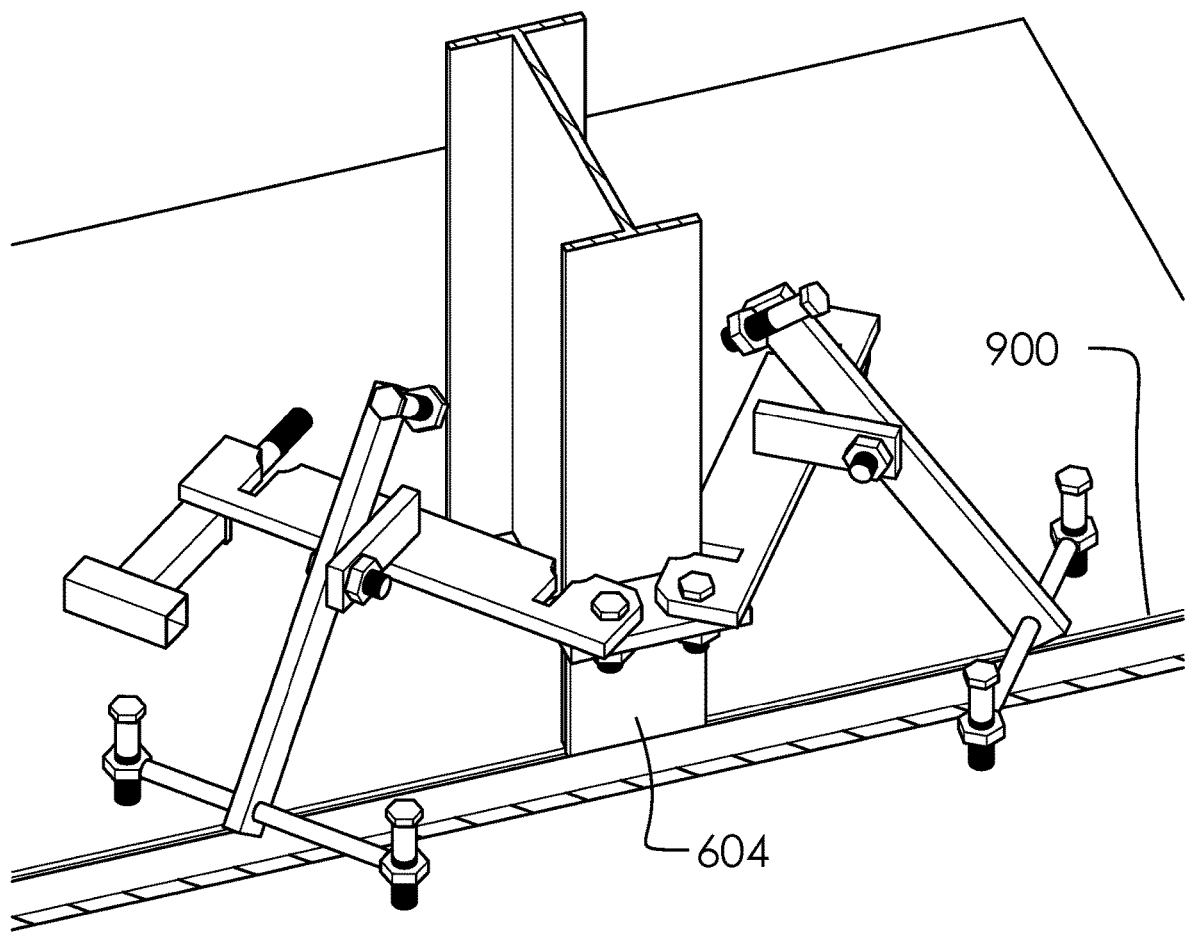

FIGS. 8 and 9 illustrate a perspective overview of said I-beam support system 100 in said closed configuration 108 from a front side and a rear side, respectively.

In one embodiment, said ground surface 104 can comprise a groove 900, also known as a "tin ledge", around a perimeter of a slab. One goal of said I-beam support system 100 will be to correctly space said I-beam 102 relative to said groove 900 while also maintaining said perpendicular angle 302. In one embodiment, a bottom edge of said groove tab 604 can be configured to slide into and through said groove 900 and thereby hold said I-beam 102 at a fixed distance from said groove 900. This adaptation can be useful to ensure that said I-beam 102 are correctly spaced from said groove 900. A fixed spacing can be advantageous when quickly building a structure so that siding can be inserted into said groove 900 and attached to said I-beam 102 consistently. Thereby, a built structure is more environmentally isolated and structurally solid by virtue of this careful and consistent spacing.

Figure 10:
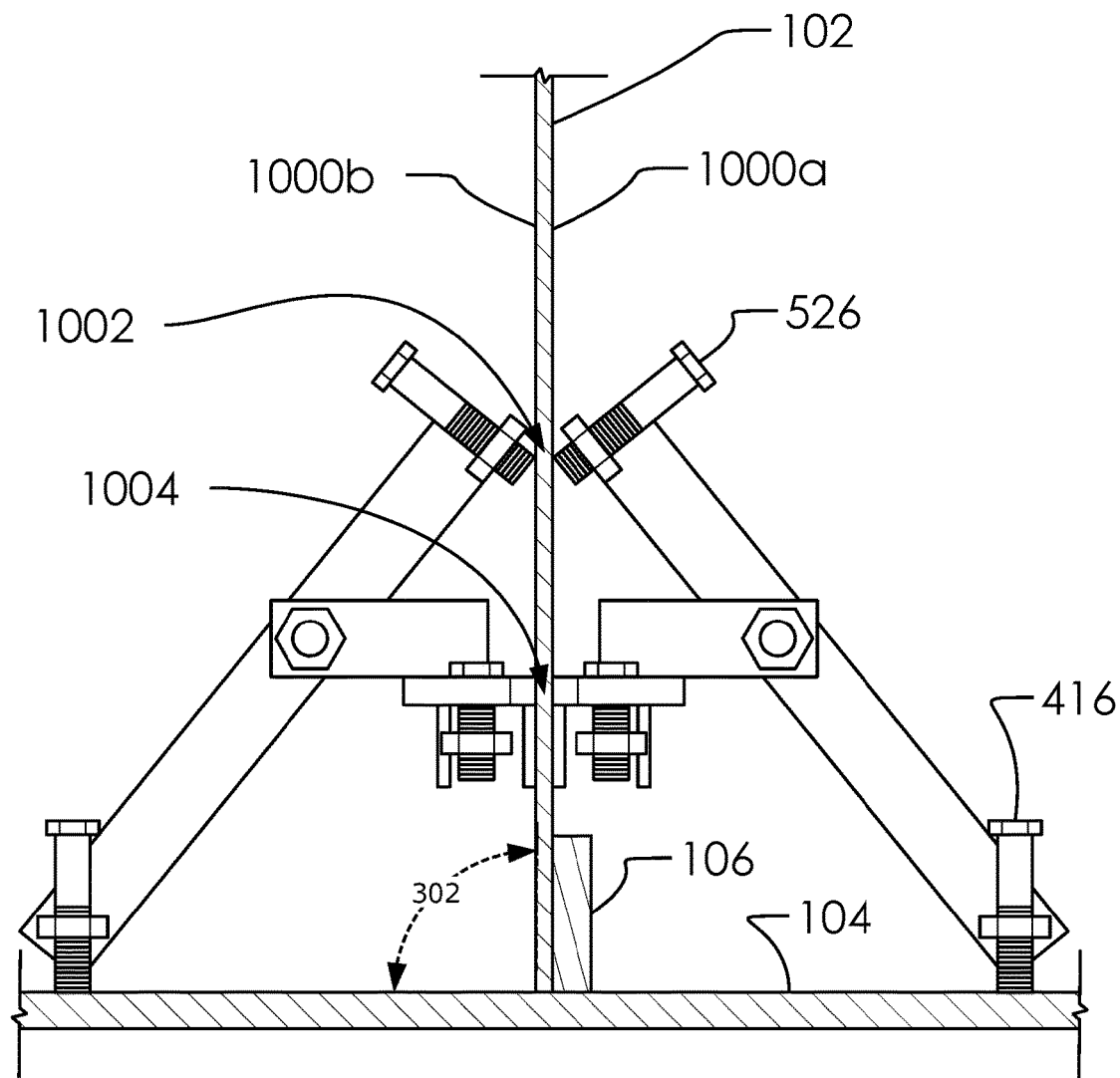
FIG. 10 illustrates an elevated side view of said first side 402a with said I-beam 102, said ground surface 104 and a weld plate 106 in cross-section.

FIG. 10 illustrates an elevated side view of said first side 402a with said I-beam 102, said ground surface 104 and said weld plate 106 in cross-section.

In one embodiment, said I-beam support system 100 can be configured to support said I-beam 102 with said beam clamp arm 408 and said upper end adjusting support 526 on a first side 1000a and a second side 1000b of said web portion 202 of said I-beam 102.

In one embodiment, said I-beam support system 100 can be configured to adjust said non-perpendicular angle 300 to said perpendicular angle 302 by selectively tightening and loosening said upper end adjusting support 526 for each among said two sides 402. In one embodiment, said I-beam support system 100 can be leveled by adjusting said two adjustable foot assemblies 416 on said lower support assembly 414 of each of said two sides 402.

Said I-beam support system 100 can comprise said upper end adjusting support 526 of said vertical support assembly 412 pressing on an upper portion 1002 of said web portion 202 of said I-beam 102 and said beam clamp arm 408 of said two sides 402 holding a lower portion 1004 of said web portion 202 to align said I-beam 102 with said perpendicular angle 302.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive.

For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

PARTS LIST said I-beam support system 100,
Said closed configuration 108,
Said I-beam 102,
Said ground surface 104,
Said open configuration 204,
Said weld plate 106,
Said two flanges 200,
Said web portion 202,
Said non-perpendicular angle 300,
Said perpendicular angle 302,
Said two sides 402,
Said first side 402a,
Said second side 402b,
Said hinge assembly 404,
Said fastener assembly 406,
Said beam clamp arm 408, Said clamp arm hinge 410,
Said vertical support assembly 412,
Said lower support assembly 414,
Said two adjustable foot assemblies 416,
Said first foot assembly 416a,
Said second foot assembly 416b,
Said nut 418,
Said bolt 420,
Said central portion 500,
Said vertical extension plate 502,
Said vertical support hinge 504,
Said first axis 506,
Said hinge end 508,
Said distal end 510,
Said interior edge 512,
Said exterior edge 514,
Said top surface 516,
Said bottom surface 518,
Said support arm 520,
Said upper end 522,
Said lower end 524,
Said upper end adjusting support 526,
Said crossbar 528,
Said two flange indentions 530,
Said first flange indention 530a,
Said second flange indention 530b,
Said second axis 532,
Said handle 600,
Said lower receiving aperture plate 602,
Said groove tab 604,
Said groove 900,
Said first side 1000a,
Said second side 1000b,
Said upper portion 1002, and
said lower portion 1004.

Preferred Embodiment Based on Original Patent Claims said I-beam support system 100 for aligning and leveling said I-beam 102 during installation on said ground surface 104. Wherein said I-beam support system 100 comprises said two sides 402, said hinge assembly 404 and said fastener assembly 406. Said two sides 402 comprise said first side 402a and said second side 402b. Each among said two sides 402 comprises said beam clamp arm 408, said clamp arm hinge 410, said vertical support assembly 412, and said lower support assembly 414. Said lower support assembly 414 can be configured to support said vertical support assembly 412 on said ground surface 104. Said I-beam support system 100 can be configured to selectively transition between said closed configuration 108 and said open configuration 204. Said closed configuration 108 comprises said fastener assembly 406 holding said two sides 402 around a portion of said I-beam 102. Said open configuration 204 comprises said two sides 402 unconnected at said distal end 510 of said beam clamp arm 408. Each among said vertical support assembly 412 comprise said upper end adjusting support 526. Said I-beam support system 100 can be configured to selectively press on said upper portion 1002 of said web portion 202 of said I-beam 102 with said upper end adjusting support 526 of said vertical support assembly 412. Said beam clamp arm 408 of said two sides 402 can be configured for holding said lower portion 1004 of said web portion 202 to align said I-beam 102. By selectively adjusting an angle between said upper portion 1002 and said lower portion 1004, said I-beam support system 100 can be configured to adjust said perpendicular angle 302 of said I-beam 102. Said vertical support assembly 412 can attach to said central portion 500 of said beam clamp arm 408 using said vertical extension plate 502 and said vertical support hinge 504. For each among said two sides 402, said vertical support assembly 412 can rotate about said first axis 506 aligned with said vertical support hinge 504. Said vertical support assembly 412 comprises said support arm 520 having said upper end 522 and said lower end 524. Said vertical support hinge 504 can rotateably attach a central portion of said support arm 520 with a portion of said vertical extension plate 502. Said vertical support assembly 412 can further comprise said upper end adjusting support 526 attached to said upper end 522. Said upper end adjusting support 526 comprises an assembly of said nut 418 and said bolt 420 with said nut 418 attached to a portion of said upper end 522 and said bolt 420 selectively screwed into said nut 418.

Said I-beam support system 100 for aligning and leveling said I-beam 102 during installation on said ground surface 104. Wherein said I-beam support system 100 comprises said two sides 402, said hinge assembly 404 and said fastener assembly 406. Said two sides 402 comprise said first side 402a and said second side 402b. Each among said two sides 402 comprises said beam clamp arm 408, said clamp arm hinge 410, said vertical support assembly 412, and said lower support assembly 414. Said lower support assembly 414 can be configured to support said vertical support assembly 412 on said ground surface 104. Said I-beam support system 100 can be configured to selectively transition between said closed configuration 108 and said open configuration 204. Said closed configuration 108 comprises said fastener assembly 406 holding said two sides 402 around a portion of said I-beam 102. Said open configuration 204 comprises said two sides 402 unconnected at said distal end 510 of said beam clamp arm 408. Each among said vertical support assembly 412 comprise said upper end adjusting support 526. Said I-beam support system 100 can be configured to selectively press on said upper portion 1002 of said web portion 202 of said I-beam 102 with said upper end adjusting support 526 of said vertical support assembly 412. Said beam clamp arm 408 of said two sides 402 can be configured for holding said lower portion 1004 of said web portion 202 to align said I-beam 102. By selectively adjusting an angle between said upper portion 1002 and said lower portion 1004, said I-beam support system 100 can be configured to adjust said perpendicular angle 302 of said I-beam 102. Said vertical support assembly 412 can attach to said central portion 500 of said beam clamp arm 408 using said vertical extension plate 502 and said vertical support hinge 504. For each among said two sides 402, said vertical support assembly 412 can rotate about said first axis 506 aligned with said vertical support hinge 504. Said vertical support assembly 412 comprises said support arm 520 having said upper end 522 and said lower end 524. Said vertical support hinge 504 can rotateably attach a central portion of said support arm 520 with a portion of said vertical extension plate 502. Said vertical support assembly 412 can further comprise said upper end adjusting support 526 attached to said upper end 522. Said upper end adjusting support 526 comprises an assembly of said nut 418 and said bolt 420 with said nut 418 attached to a portion of said upper end 522 and said bolt 420 selectively screwed into said nut 418.

Said I-beam support system 100 for aligning and leveling said I-beam 102 during installation on said ground surface 104. Wherein said I-beam support system 100 comprises said two sides 402, said hinge assembly 404 and said fastener assembly 406. Said two sides 402 comprise said first side 402a and said second side 402b. Each among said two sides 402 comprises said beam clamp arm 408, said clamp arm hinge 410, said vertical support assembly 412, and said lower support assembly 414. Said lower support assembly 414 can be configured to support said vertical support assembly 412 on said ground surface 104. Said I-beam support system 100 can be configured to selectively transition between said closed configuration 108 and said open configuration 204. Said closed configuration 108 comprises said fastener assembly 406 holding said two sides 402 around a portion of said I-beam 102. Said open configuration 204 comprises said two sides 402 unconnected at said distal end 510 of said beam clamp arm 408. Each among said vertical support assembly 412 comprise said upper end adjusting support 526. Said I-beam support system 100 can be configured to selectively press on said upper portion 1002 of said web portion 202 of said I-beam 102 with said upper end adjusting support 526 of said vertical support assembly 412. Said beam clamp arm 408 of said two sides 402 can be configured for holding said lower portion 1004 of said web portion 202 to align said I-beam 102. By selectively adjusting an angle between said upper portion 1002 and said lower portion 1004, said I-beam support system 100 can be configured to adjust said perpendicular angle 302 of said I-beam 102.

Said fastener assembly 406 comprises said nut 418 on one side of said two sides 402 and said bolt 420 on the other side. Said fastener assembly 406 further comprises said handle 600 for twisting said bolt 420 to tighten and loosen said two sides 402. Each among said two sides 402 comprise said lower receiving aperture plate 602 for aligning and receiving said fastener assembly 406.

Said vertical support assembly 412 can attach to said central portion 500 of said beam clamp arm 408 using said vertical extension plate 502 and said vertical support hinge 504. For each among said two sides 402, said vertical support assembly 412 can rotate about said first axis 506 aligned with said vertical support hinge 504.

Said vertical support assembly 412 comprises said support arm 520 having said upper end 522 and said lower end 524. Said vertical support hinge 504 can rotateably attach a central portion of said support arm 520 with a portion of said vertical extension plate 502. Said vertical support assembly 412 can further comprise said upper end adjusting support 526 attached to said upper end 522. Said upper end adjusting support 526 comprises an assembly of said nut 418 and said bolt 420 with said nut 418 attached to a portion of said upper end 522 and said bolt 420 selectively screwed into said nut 418.

Each among said beam clamp arm 408 comprise said hinge end 508, said distal end 510, said interior edge 512, said exterior edge 514, said top surface 516 and said bottom surface 518. Said interior edge 512 of said beam clamp arm 408 comprises said two flange indentions 530 comprising said first flange indention 530a and said second flange indention 530b.

Said I-beam support system 100 can be configured to support said I-beam 102 with said beam clamp arm 408 at said lower portion 1004, and said upper end adjusting support 526 on said first side 1000a and said second side 1000b of said web portion 202 of said I-beam 102 at said upper portion 1002. Said I-beam support system 100 can be configured to adjust said non-perpendicular angle 300 to said perpendicular angle 302 by selectively tightening and loosening said upper end adjusting support 526 for each among said two sides 402.

Each said lower support assembly 414 of said two sides 402 comprises said two adjustable foot assemblies 416 comprising said first foot assembly 416a and said second foot assembly 416b. Said two adjustable foot assemblies 416 can each comprise said nut 418 being affixed to a portion of said lower support assembly 414 and said bolt 420 configured to screw up and down through said nut 418. Wherein, said two adjustable foot assemblies 416 can be adjusted relative to said lower support assembly 414 by turning said bolt 420.

Said I-beam support system 100 can be leveled by adjusting said two adjustable foot assemblies 416 on said lower support assembly 414 of each of said two sides 402.

Said lower support assembly 414 can connect to a portion of said lower end 524 of said support arm 520. Said lower support assembly 414 comprises said crossbar 528 extending in a substantially perpendicular and horizontal direction relative to said support arm 520. Said two adjustable foot assemblies 416 can be attached at each end of said crossbar 528.

Each among said beam clamp arm 408 comprise said hinge end 508, said distal end 510, said interior edge 512, said exterior edge 514, said top surface 516 and said bottom surface 518. Each among said two sides 402 comprises said second axis 532 aligned with said clamp arm hinge 410 and proximate to said hinge end 508 of said beam clamp arm 408. Said second axis 532 comprises a substantially vertical axis configured to allow each among said two sides 402 to open and close relative to one another to selectively enclose a portion of said I-beam 102.

Said ground surface 104 comprises said groove 900. Said hinge assembly 404 can further comprise said groove tab 604 being substantially vertical and below said hinge end 508 of said two sides 402. Said I-beam support system 100 can be configured to correctly space said I-beam 102 relative to said groove 900 while also maintaining said perpendicular angle 302 using said groove tab 604. A bottom edge of said groove tab 604 can be configured to slide into and through a portion of said groove 900 and thereby hold said I-beam 102 at a fixed distance from said groove 900.

Said I-beam support system 100 for aligning and leveling said I-beam 102 during installation on said ground surface 104. Wherein said I-beam support system 100 comprises said two sides 402, said hinge assembly 404 and said fastener assembly 406. Said two sides 402 comprise said first side 402a and said second side 402b. Each among said two sides 402 comprises said beam clamp arm 408, said clamp arm hinge 410, said vertical support assembly 412, and said lower support assembly 414. Said lower support assembly 414 can be configured to support said vertical support assembly 412 on said ground surface 104. Said I-beam support system 100 can be configured to selectively transition between said closed configuration 108 and said open configuration 204. Said closed configuration 108 comprises said fastener assembly 406 holding said two sides 402 around a portion of said I-beam 102. Said open configuration 204 comprises said two sides 402 unconnected at said distal end 510 of said beam clamp arm 408. Each among said vertical support assembly 412 comprise said upper end adjusting support 526. Said I-beam support system 100 can be configured to selectively press on said upper portion 1002 of said web portion 202 of said I-beam 102 with said upper end adjusting support 526 of said vertical support assembly 412. Said beam clamp arm 408 of said two sides 402 can be configured for holding said lower portion 1004 of said web portion 202 to align said I-beam 102. By selectively adjusting an angle between said upper portion 1002 and said lower portion 1004, said I-beam support system 100 can be configured to adjust said perpendicular angle 302 of said I-beam 102. Each among said beam clamp arm 408 comprise said hinge end 508, said distal end 510, said interior edge 512, said exterior edge 514, said top surface 516 and said bottom surface 518. Said interior edge 512 of said beam clamp arm 408 comprises said two flange indentions 530 comprising said first flange indention 530a and said second flange indention 530b.

Said I-beam support system 100 can be configured to support said I-beam 102 with said beam clamp arm 408 at said lower portion 1004, and said upper end adjusting support 526 on said first side 1000a and said second side 1000b of said web portion 202 of said I-beam 102 at said upper portion 1002. Said I-beam support system 100 can be configured to adjust said non-perpendicular angle 300 to said perpendicular angle 302 by selectively tightening and loosening said upper end adjusting support 526 for each among said two sides 402.

Each said lower support assembly 414 of said two sides 402 comprises said two adjustable foot assemblies 416 comprising said first foot assembly 416a and said second foot assembly 416b. Said two adjustable foot assemblies 416 can each comprise said nut 418 being affixed to a portion of said lower support assembly 414 and said bolt 420 configured to screw up and down through said nut 418. Wherein, said two adjustable foot assemblies 416 can be adjusted relative to said lower support assembly 414 by turning said bolt 420.

Said I-beam support system 100 can be leveled by adjusting said two adjustable foot assemblies 416 on said lower support assembly 414 of each of said two sides 402.

Said lower support assembly 414 can connect to a portion of said lower end 524 of said support arm 520. Said lower support assembly 414 comprises said crossbar 528 extending in a substantially perpendicular and horizontal direction relative to said support arm 520. Said two adjustable foot assemblies 416 can be attached at each end of said crossbar 528.

The invention claimed is:

1. An I-beam support system for aligning and leveling an I-beam during installation on a ground surface wherein:
    said I-beam support system comprises two sides, a hinge assembly and a fastener assembly;
    said two sides comprise a first side and a second side;
    each among said two sides comprises:
        a beam clamp arm having a distal end and a hinge end,
        a clamp arm hinge,
        a vertical support assembly having an upper end adjusting support, an upper end and a lower end, and
        a lower support assembly;
    for each among said two sides:
        said lower support assembly is configured to support said vertical support assembly on said ground surface;
    said I-beam support system is configured to selectively transition between a closed configuration and an open configuration;
    said closed configuration comprises said fastener assembly being configured to hold said two sides around a portion of said I-beam;
    said open configuration comprises said two sides opened relative to one another having rotated said beam clamp arm of each among said two sides away from one another;
    with said I-beam support system in said closed configuration, said two sides are configured to surround and support both sides of said I-beam at an upper portion and a lower portion of said I-beam and thereby align said I-beam with said I-beam support system;
    said vertical support assembly of each of said two sides are configured to:
        selectively press on both sides of said upper portion of a web portion of said I-beam with each among said vertical support assembly arranged on opposite sides of said I-beam;
    said beam clamp arm of each said two sides are configured to:
        selectively hold said lower portion of said web portion of said I-beam by clamping said lower portion between said beam clamp arm of said first side and said beam clamp arm of said second side; and
    by selectively adjusting an angle between said upper portion and said lower portion, said I-beam support system is configured to adjust an alignment of said I-beam relative to said I-beam support system.

2. The I-beam support system of claim 1; wherein:
    said fastener assembly further comprises a nut and a bolt configured to selectively attach said first side to said second side;
    said fastener assembly further comprises a handle for twisting said bolt to tighten and loosen said two sides relative to one another; and
    each among said two sides comprise a lower receiving aperture plate for aligning and receiving said fastener assembly.

3. The I-beam support system of claim 1; wherein:
    for each among said two sides said vertical support assembly is adapted to
        attach to a central portion of said beam clamp arm using a vertical extension plate and a vertical support hinge, and
        rotate about a first axis aligned with said vertical support hinge.

4. The I-beam support system of claim 3; wherein:
    for each among said two sides
        said vertical support hinge is adapted to rotateably attach a central portion of said support arm with a portion of said vertical extension plate;
    for each among said two sides
        said vertical support assembly further comprises said upper end adjusting support attached to said upper end configured to selectively extend and contract to adjust an alignment of said upper portion of a web portion of said I-beam relative to said I-beam support system.

5. The I-beam support system of claim 1; wherein:
    for each among said two sides
        said beam clamp arm comprises said hinge end, said distal end, an interior edge, an exterior edge, a top surface and a bottom surface, and
        said interior edge of said beam clamp arm, of each of said two sides, comprises two flange indentions comprising a first flange indention and a second flange indention.

6. The I-beam support system of claim 1; wherein:
    for each among said two sides said upper end adjusting support comprises a nut and a bolt,
wherein, selectively tightening and loosening said bolt causes a portion of said bolt to extend or contract relative to said bolt.

7. The I-beam support system of claim 1; wherein:
for each among said lower support assembly of said two sides
said lower support assembly comprises two adjustable foot assemblies, comprising a first foot assembly and a second foot assembly; each of said two adjustable foot assemblies of said lower support assembly of said two sides
comprise a nut being affixed to a portion of said lower support assembly and a bolt configured to screw up and down through said nut to adjust a level of said lower support assembly.

8. The I-beam support system of claim 7; wherein:
for each of said lower support assembly of said two sides
said lower support assembly is adapted to connect to a portion of said lower end of said support arm,
said lower support assembly comprises a crossbar extending in a substantially perpendicular and horizontal direction relative to said support arm, and
said two adjustable foot assemblies are attached at each end of said crossbar.

9. The I-beam support system of claim 1 wherein:
for each among said two sides
said beam clamp arm comprises said hinge end, said distal end, an interior edge, an exterior edge, a top surface and a bottom surface;
each among said two sides comprise a second axis aligned with said clamp arm hinge and proximate to said hinge end of said beam clamp arm; and
for each among said two sides
said second axis comprises a substantially vertical axis configured to allow each among said two sides to open and close relative to one another to selectively enclose a portion of said I-beam.

10. The I-beam support system of claim 1 wherein:
said ground surface comprises a groove;
said hinge assembly further comprises a groove tab being substantially vertical and below said hinge end of said two sides;
said I-beam support system is configured to correctly space said I-beam relative to said groove while also maintaining said perpendicular angle using said groove tab; and
a bottom edge of said groove tab is configured to slide into and through a portion of said groove and thereby hold said I-beam at a fixed distance from said groove.

\* \* \* \* \*